(12) United States Patent
Crockett et al.

(10) Patent No.: US 6,772,303 B2
(45) Date of Patent: *Aug. 3, 2004

(54) SYSTEM AND METHOD FOR DYNAMICALLY RESYNCHRONIZING BACKUP DATA

(75) Inventors: Robert Nelson Crockett, Tucson, AZ (US); Ronald Maynard Kern, Tucson, AZ (US); Gregory Edward McBride, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 358 days.

This patent is subject to a terminal disclaimer.

(21) Appl. No.: 09/785,926

(22) Filed: Feb. 15, 2001

(65) Prior Publication Data

US 2001/0010070 A1 Jul. 26, 2001

Related U.S. Application Data

(63) Continuation of application No. 09/134,543, filed on Aug. 13, 1998, now Pat. No. 6,260,124.

(51) Int. Cl.[7] .............................................. G06F 12/00
(52) U.S. Cl. ........................ 711/162; 711/161; 711/165; 711/112; 714/6
(58) Field of Search ........................ 711/112, 111, 114, 711/161, 162, 165, 154; 714/5, 6, 7, 12, 20

(56) References Cited

U.S. PATENT DOCUMENTS

| | | | |
|---|---|---|---|
| 5,220,657 A | 6/1993 | Bly et al. ..................... 711/152 |
| 5,446,871 A | 8/1995 | Shomler et al. ............... 714/1 |
| 5,491,780 A | 2/1996 | Fyles et al. .................. 711/152 |
| 5,504,861 A | 4/1996 | Crockett et al. .............. 714/13 |
| 5,513,314 A * | 4/1996 | Kandasamy et al. ............ 714/6 |
| 5,555,371 A * | 9/1996 | Duyanovich et al. .......... 714/13 |
| 5,592,618 A | 1/1997 | Micka et al. .................. 714/54 |
| 5,615,329 A | 3/1997 | Kern et al. ..................... 714/6 |
| 5,623,599 A | 4/1997 | Shomler ....................... 714/18 |
| 5,657,440 A | 8/1997 | Micka et al. .................. 714/16 |
| 5,682,513 A | 10/1997 | Candelaria et al. .......... 711/113 |
| 5,692,155 A | 11/1997 | Iskiyan et al. ............... 711/162 |
| 5,699,510 A | 12/1997 | Petersen et al. .............. 714/54 |
| 5,720,029 A | 2/1998 | Kern et al. ................... 712/200 |
| 5,799,141 A | 8/1998 | Galipeau et al. .............. 714/13 |
| 5,870,537 A | 2/1999 | Kern et al. ..................... 714/6 |
| 5,949,970 A | 9/1999 | Sipple et al. ................ 711/162 |
| 5,987,566 A | 11/1999 | Vishlitzky et al. ........... 711/114 |
| 6,044,444 A | 3/2000 | Ofek .......................... 711/162 |
| 6,101,497 A | 8/2000 | Ofek ........................... 707/10 |
| 6,173,377 B1 * | 1/2001 | Yanai et al. ................. 711/162 |
| 6,199,074 B1 * | 3/2001 | Kern et al. .................. 707/204 |
| 6,463,573 B1 * | 10/2002 | Maddalozzo, Jr. et al. ..... 716/6 |

OTHER PUBLICATIONS

R. Shomler, "Integration of Persistent Memory Data . . . ", IBM Technical Disclosure Bulletin, vol. 39, No. 10 (Oct. 1996).

* cited by examiner

*Primary Examiner*—Pierre Bataille

(57) ABSTRACT

Backup storage is resynchronized to primary storage, ensuring that any new updates received during resynchronization are applied in the proper order relative to resynchronization data. Under normal operations, a data mover mirrors data stored in primary storage to backup storage. If an error condition arises, preventing mirroring, the data mover stores newly received data in primary storage without mirroring the data to backup storage. The data mover also identifies this data in an update map. When the error condition ends, the data mover performs a static resynchronization process, serving to update the backup storage with the un-mirrored data, identified in the update map. When new data is received during static resynchronization, a dynamic resynchronization process is invoked to accurately process the updates. Dynamic resynchronization ensures that newly received data records are copied to backup storage in the proper order (if at all) with respect to versions of the same data being processed by static resynchronization.

18 Claims, 5 Drawing Sheets

SYSTEM AND METHOD FOR DYNAMICALLY RESYNCHRONIZING BACKUP DATA

CROSS-REFERENCE TO RELATED APPLICATIONS

This application is a continuation of U.S. patent application Ser. No. 09/134,543 filed on Aug. 13, 1998 now U.S. Pat. No. 6,260,124 in the names of Ronald Kern, Robert Crockett, and Gregory McBride entitled "SYSTEM AND METHOD FOR DYNAMICALLY RESYNCHRONIZING BACKUP DATA."

BACKGROUND OF THE INVENTION

1. Field of the Invention

This invention relates to digital data storage systems. More particularly, the invention concerns the resynchronization of backup storage to primary storage, ensuring that any updates received during resynchronization are applied in the proper order relative to resynchronization data.

2. Description of the Related Art

In this information era, there is more data than ever to transmit, receive, analyze, and process. Another key data management function is data storage. Most applications demand data storage that is fast, reliable, and convenient. Data storage is especially critical in certain data-intensive businesses. Some examples include automated teller networks and other banking applications, telephone directory information services, investment fund management, and the like.

In many of these businesses, the high cost of data loss warrants maintaining a duplicate copy of the data. Thus, if the primary data is lost, corrupted, or otherwise unavailable, business can seamlessly continue by using the backup data instead of the primary data. One technique for performing data backups is "remote copy," a technique that is implemented in various backup storage systems of International Business Machines Corp. (IBM). With remote copy, changes to data on a primary site are shadowed to a secondary site. The secondary site therefore mirrors or "shadows" the primary site. Each site, for example, may include a storage controller and one or more storage devices. Normally, remote copy is implemented by a separate processing machine called a "data mover," coupled to both primary and secondary sites.

If the shadowing stops for some reason, the data on the primary and secondary sites is no longer the same. Shadowing may stop for various reasons, such as interruption of primary/secondary communications, errors occurring at the secondary site, etc. After the problem is corrected, shadowing resumes under a "restart" procedure. At this point, primary data that was changed ("updated") during the shadowing interruption must be copied from the primary site to the secondary site, thereby bring the secondary site up to date. This process is called "resynchronization."

At first glance, resynchronization appears to be a simple procedure. The unshadowed changes to the primary site are simply copied over to the secondary site. In practice, resynchronization is more complicated because data storage is actually a dynamic process, and further updates to the primary site often occur during resynchronization. Furthermore, this problem is compounded because the updating and resynchronization processes both occur asynchronously. Accordingly, one danger is that old updates are copied to the secondary site, overwriting more recent data copied during resynchronization. Another danger is that resynchronization data is applied to the secondary site overwriting newer data already copied during the update process.

If resynchronization is performed improperly, the consequences can be severe. Data may be corrupted or lost, resulting in failed read and write operations. In extreme cases, a read operation might even recall the wrong data.

The foregoing conditions are worsened because of the data mover's independence from the host computers writing new data to the primary site. This arrangement is an advantage in one sense, because the hosts can continually write to the primary site in spite of any interruption in data mirroring. Critical storage-related host functions therefore continue without a hitch. However, this makes the data mover's job even more difficult, because data updates to the primary site arrive continually.

Consequently, due to certain unsolved problems such as those discussed above, known resynchronization procedures are not entirely adequate for all purposes.

SUMMARY OF THE INVENTION

Broadly, the present invention concerns the resynchronization of backup storage to primary storage, ensuring that any updates received during resynchronization are applied in the proper order relative to resynchronization data. The invention is applied in a data storage system having primary and backup storage each coupled to a data mover. Under normal operations, the data mover mirrors data stored on the primary storage upon the backup storage.

In some cases, error conditions arise preventing proper mirroring of data from the primary site to the backup storage. These conditions include failure of the backup storage, communications failure between the data mover and backup storage, etc. In these situations, the data mover stores any data records received by the storage system in the primary storage without mirroring the data records to the backup storage. The data mover also identifies the tracks that these data records are on in an update map.

When the error condition ends, the data mover performs a static resynchronization process, which begins by accessing the update map to identify a group of tracks containing new data records received during the error condition. The data mover reads these tracks, and then proceeds to write these read tracks to the backup storage. The data mover also makes an entry in a progress queue, this entry including (1) a group-ID identifying the tracks written to backup storage and (2) a read time-stamp ("RT") identifying the time when the data mover read these tracks from primary storage. The process of identifying, reading, and writing tracks continues until all tracks in the update have been processed.

Whenever the storage system receives new data records ("updates"), this invokes a dynamic resynchronization process. Advantageously, this process may occur simultaneously with the static resynchronization process, serving to accurately process updates despite ongoing static resynchronization. First, the dynamic resynchronization process determines whether the static resynchronization process is ongoing. If not, the updates are written to primary storage and the data mover mirrors the written updates to backup storage, as in normal circumstances.

However, if static resynchronization is underway, the dynamic resynchronization process determines whether the update is already identified in the update map. If not, this record is not the subject of static resynchronization, and it can be immediately written to backup storage.

On the other hand, if the current update is already represented in the update map, care is needed to ensure that the dynamic and static resynchronization process occur in the proper relative order, to avoid writing older data over newer data. Accordingly, a determination is first made whether (1) the update corresponds to any of the tracks present in the progress queue. If not, there is a danger that the static and dynamic resynchronization process might apply their data in the wrong order. In this event, dynamic resynchronization waits until the data record is shown in the progress queue.

Once the update is represented in the queue, a comparison is made between the data record's read time-stamp and its write time-stamp. The write time-stamp shows when a host originally sent the data record to the primary controller for writing. If the write time-stamp is earlier than the read time-stamp, the update will already be included in the static resynchronization. On the other hand, if the write time-stamp is later than the read time-stamp, this is a new update not included in static resynchranization; thus, the dynamic resynchronization process applies it to the backup storage.

Accordingly, one embodiment of the invention involves a method to resynchronize backup storage to primary storage, ensuring that any updates received during resynchronization are applied in the proper order relative to resynchronization data. In another embodiment, the invention may be implemented to provide an apparatus, such as a data storage system, programmed to resynchronize backup storage to primary storage, ensuring that any updates received during resynchronization are applied in the proper order relative to resynchronization data. In still another embodiment, the invention may be implemented to provide a signal-bearing medium tangibly embodying a program of machine-readable instructions executable by a digital data processing apparatus to perform method steps for resynchronizing backup storage to primary storage, ensuring that any updates received during resynchronization are applied in the proper order relative to resynchronization data.

The invention affords its users with a number of distinct advantages. Chiefly, the invention preserves data integrity by maintaining the order of storage operations, despite the receipt of data updates during resynchronization. This helps avoid overwriting newer data with older data. Additionally, the invention helps preserve the smooth storage of data from the user's perspective, despite temporary unavailability of backup storage. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns the resynchronization of backup storage to primary storage, ensuring that any updates received during resynchronization are applied in the proper order relative to resynchronization data.

HARDWARE COMPONENTS & INTERCONNECTIONS

Data Storage System

Introduction

Figure 1:
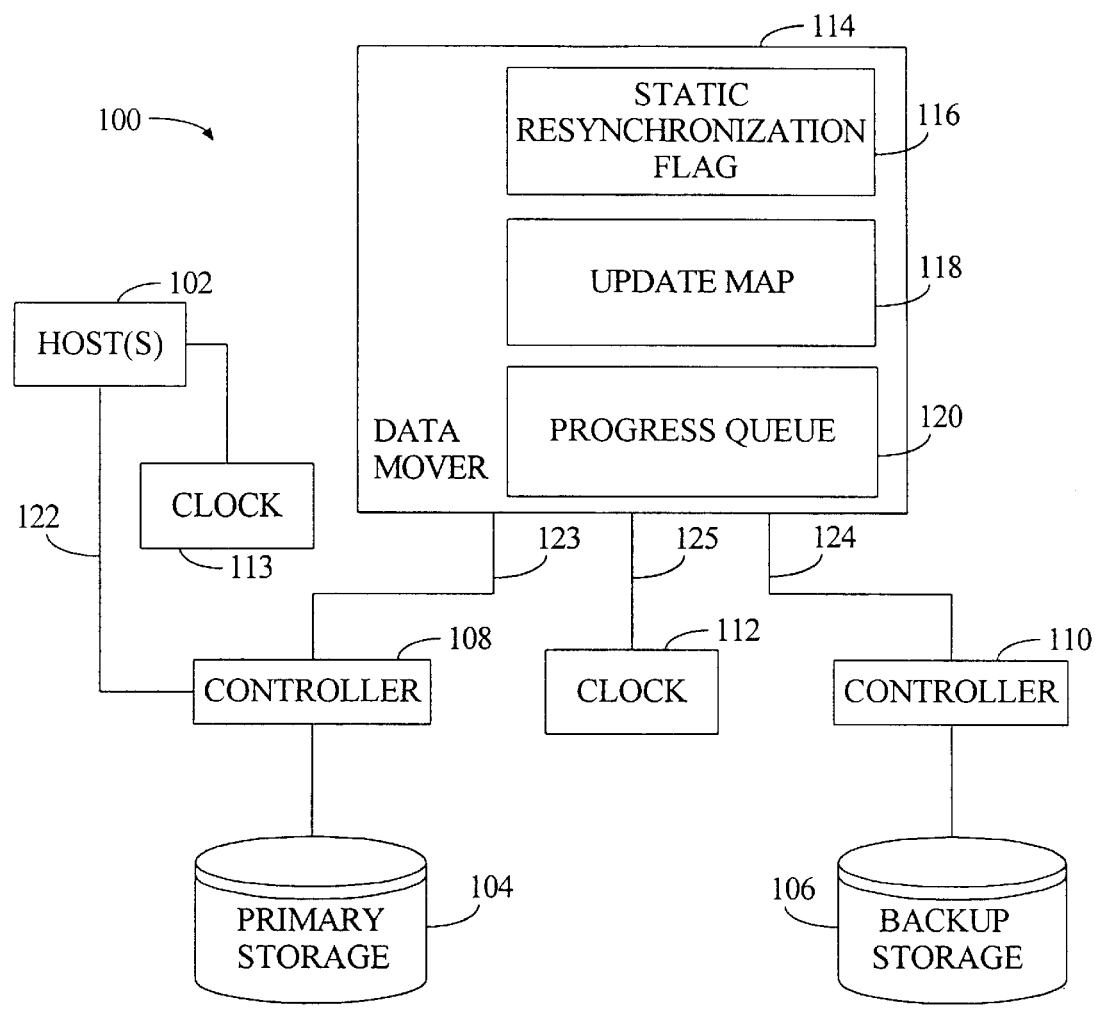
FIG. 1 is a block diagram of the hardware components and interconnections of a data storage system in accordance with the invention.

One aspect of the invention concerns a data storage system, which may be embodied by various hardware components and interconnections as shown by the data storage system 100 of FIG. 1. The system 100 includes one or more host computers ("host(s)") 102; for ease of discussion, the present illustration uses a single host 102, although there may be multiple hosts. The system also includes a primary storage 104, a backup storage 106, and a data mover 114. The primary storage 104 and backup storage 106 are coupled to respective storage controllers 108, 110. The primary storage 104 and its controller 108 may be referred to as a "primary storage site," whereas the backup storage 106 and its controller 110 may be referred to as a "backup storage site." Both controllers 108, 110 are coupled to the data mover 114. The host 102 and data mover 114 are coupled to respective clocks 113, 112.

Generally, the host receives data to be stored on the primary storage 104. This data may originate from a source external to the host 102, such as a user console, measurement device, storage device, a remote computer, or another source. In contrast, data may also arise from within the host 102, such as by the host 102 executing an application program, etc. The host 102 passes the data to the controller 108, which manages all read/write operations involving the storage 104.

Largely independent of the activity of the host 102 and primary storage 104, the data mover 114 serves to copy data from the primary storage 104 to the backup storage 106, thus mirroring the contents of the primary storage 104 at the backup storage 106. The storage controller 110 manages read/write operations at the backup storage 106, similar to the relationship between the controller 108 and the primary storage 104.

As explained in detail below, if the backup storage 106 becomes unavailable for a period of time, the primary storage 104 continues to receive new data records while the backup storage 106 does not. This may occur, for example, if there is a failure of a component of the backup storage 106 or communications between the data mover 114 and the backup storage. When the backup storage 106 comes back on line, the data mover 114 performs a "static resynchronization" operation to update mirroring of the data that was written to the primary storage 104 during the backup storage's down time. However, the host 102 may continue to direct new data to the primary storage even during static resynchronization. Dynamic resynchronization ensures that this new data is written to the backup storage in the proper sequence relative to static resynchronization data.

More Detail

Each of the host 102, controllers 108/110, and data mover 114 may be embodied by various types of digital data processing apparatus, such as a personal computer, supercomputer, computer workstation, server, mainframe computer, etc. As a specific example, the host 102 and data mover 114 may comprise IBM model S/390 machines, with the controllers 108/110 comprising IBM model 3990 or 3390 machines.

The storage 104/106 may be provided by any suitable configuration of one or more data storage devices, such as magnetic tape, magnetic disk drive media, optical tape, optical disk, or another digital data storage machine. As a specific example, each controller and its respective storage may be provided by an IBM model 3590 RAMA III disk storage subsystem. The primary and backup storage may use any convenient unit of storage, such as a disk track, cylinder, sector, byte, bit, disk surface, tape track, tape segment, etc. Moreover, devices and data units may be logical rather than physical constructs. Throughout the present discussion, one exemplary unit of data storage is a magnetic disk storage "track," which includes multiple sub-units called "data records."

The clocks 112–113 are provided by timers of suitable accuracy for the operations discussed below, and may in one example comprise IBM Sysplex Timers, P/N 9037-002. The data mover 114 includes various storage facilities provided by software, hardware or a combination of both. These storage facilities include a progress queue 120, an update map 118, and a static resynchronization flag 116. In one example, each storage facility is provided by a memory buffer, register, RAM addresses of the data mover 114, etc. As explained below, the progress queue 120 helps identify the data records currently being processed by static resynchronization. The update map 118 lists tracks that have been written to primary storage but not yet mirrored to backup storage 106 due to an error condition giving rise to static resynchronization. Accordingly, the update map 118 may comprise a bit map, table, or other suitable construct that cross-references primary storage tracks and their update status. The static resynchronization flag 116 signifies that static resynchronization is underway, and may be a memory bit for example.

Communication links 122–125 interconnect the host, data mover, controllers, and clock as shown in FIG. 1. The communication links 122–125 may be provided by any suitable component for conveying digital signals with suitable speed and accuracy, such as wires, busses, cables, backplanes, fiber optic cables, wireless broadcast, satellite, telephone lines, computer network (such as Internet, Intranet, local area network, wide area network . . . ), etc.

To further illustrate the construction of the system 100, the system 100 may be provided by the Extended Remote Copy ("XRC") system, sold by International Business Machines Corp. (IBM). In the XRC system, storage operations are "asynchronous," since data records are committed to primary storage 104 without regard for whether the corresponding data has been written to backup storage 106.

Backup storage 106 is guaranteed to be consistent with the state of the primary storage 104 at some specific time in the past. This is because the XRC system "write timestamps" data updates stored in the primary storage, enabling the backup storage to implement the updates in the same order. Write time-stamping in the XRC system is done with the clock 113. Since the backup device is always consistent with a past state of the primary device, a limited amount of data is lost if the primary device fails.

The operation of the system 100 is discussed in greater detail below.

Exemplary Digital Data Processing Apparatus

Another aspect of the invention concerns a digital data processing apparatus, provided to resynchronize backup storage to primary storage, ensuring that any updates received during resynchronization are applied in the proper order relative to resynchronization data. This apparatus may be embodied by various hardware components and interconnections, and may be implemented in the data mover 114.

Figure 2:
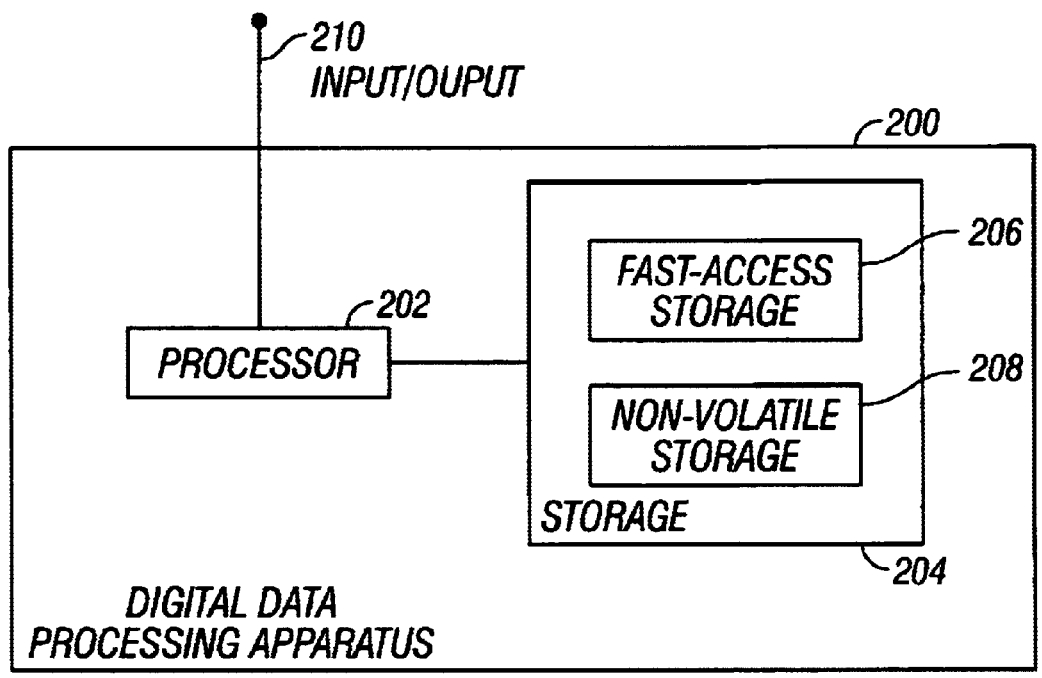
FIG. 2 is a block diagram of an exemplary digital data processing machine in accordance with the invention.

FIG. 2 shows an example of one digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the various hardware embodiments described above, a different aspect of the invention concerns a method for resynchronizing backup storage to primary storage, ensuring that any updates received during resynchronization are applied in the proper order relative to resynchronization data.

Signal-Bearing Media

In the context of FIGS. 1–2, such a method may be implemented, for example, by operating the data mover 114, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to resynchronize backup storage to primary storage, ensuring that any updates received during resynchronization are applied in the proper order relative to resynchronization data.

Figure 3:
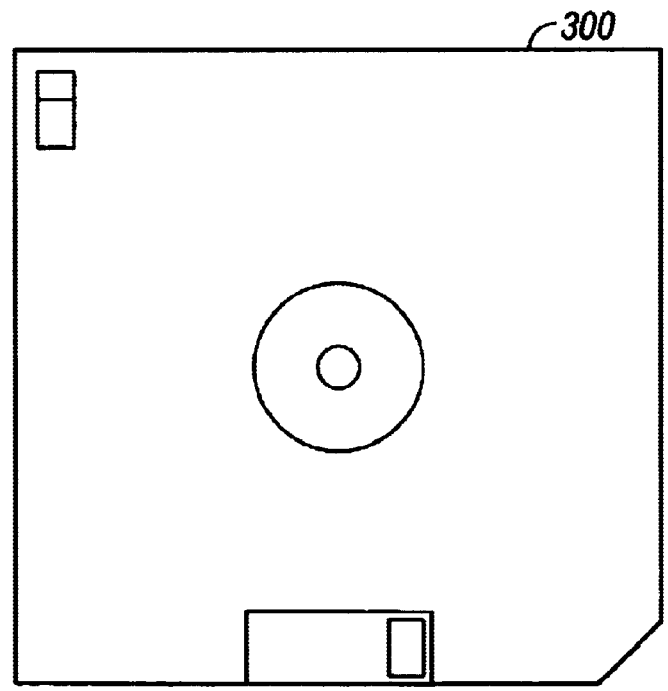
FIG. 3 shows an exemplary signal-bearing medium in accordance with the invention.

This signal-bearing media may comprise, for example, RAM (not shown) accessible by the processor 202, as embodied by the fast access storage 206, for example. Alternatively, the instructions may be contained in another signal-bearing media, such as a magnetic data storage diskette 300 (FIG. 3), directly or indirectly accessible by the processor 202. Whether contained in RAM, the diskette 300, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Overall Operation

Figure 4:
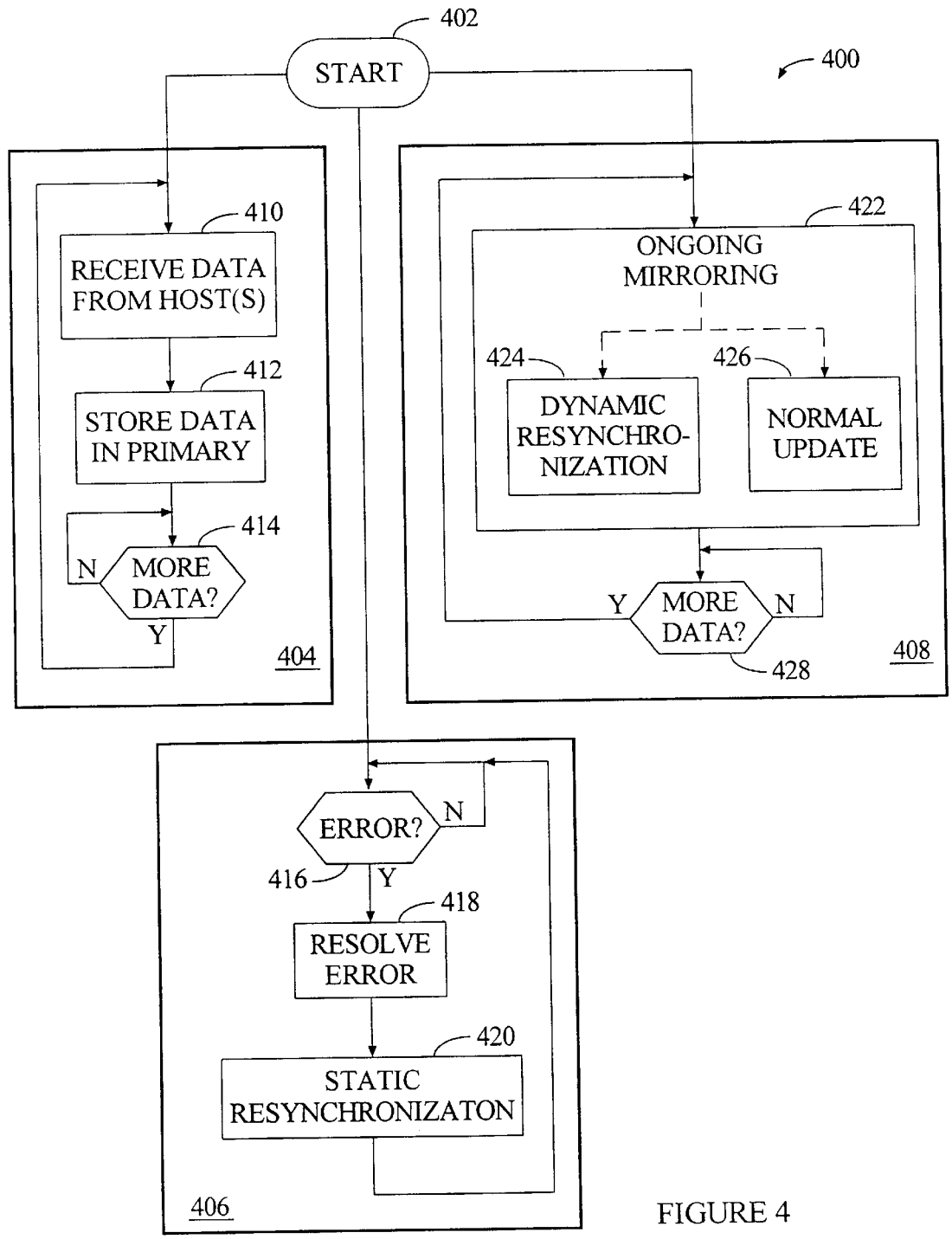
FIG. 4 is a flowchart of an overall operating sequence for data storage and backup according to the invention.

FIG. 4 shows a sequence 400 to illustrate one example of the overall operation of the invention. For ease of explanation, but without any limitation intended thereby, the example of FIG. 4 is described in the context of the hardware environment described above. The steps are initiated in step 402, when the storage system 100 is brought on line, or otherwise programmed or configured to begin storing data. After step 402, three processes 404, 406, and 408 occur in parallel. These processes are a primary storage process 404, static resynchronization process 406, and an ongoing mirroring process 408.

In the primary storage process 404, the primary controller 108 receives data from the host 102 (step 410), and writes the data to the primary storage 104 (step 412). As part of step 412, a channel program (not shown) or other suitable hardware or software construct generates a write time-stamp ("WT") signifying the time of sending the data to the controller 108, according to the clock 113. When there is more data to store, step 414 returns control to step 410.

In the static resynchronization process 406, the data mover 114 detects an "error condition" (step 416). An error condition is a state of the system 100 preventing mirroring of data from primary to backup storage. For example, the error condition may involve failure or other unavailability of the backup storage 106 or controller 110, or failure occurring in the communications chain between the backup storage 106, data mover 114, and primary controller 108. If an error condition exists, steps are taken to resolve the error (step 418). This may involve a system administrator reconfiguring one or more components of the system 100, a technician repairing or replacing a failed component, or self-repair of the affected component. When the error has been resolved, re-enabling mirroring to the backup storage 106, the data mover 114 performs static resynchronization (step 420). In this process, all data written to the primary storage 104 during the down time of the backup storage 106 is copied to the backup storage 106.

The ongoing mirroring process 408 manages the mirroring of data from primary to backup storage. As shown in step 422, this may involve normal updating of the backup storage 106 (step 426), or dynamic resynchronization (step 424). The backup storage 106 may be updated normally (step 426) when static resynchronization is not occurring. With normal updates, the data mover 114 retrieves data entries from the primary storage 104 and asynchronously copies the data to the backup storage 106. Normal updating makes the backup storage 106 mirror the primary storage 104, and may be performed using known techniques. The backup storage 106 normally only mirrors a past state of the primary storage 104 because, in most cases, new updates are being received and applied to the primary storage 104 all the time.

Dynamic resynchronization (step 424) is used to perform mirroring when static resynchronization is occurring. In this case, the data mover 114 cannot simply copy data from the primary storage 104 to the backup storage 106 because of certain dangers. Chiefly, there is a risk that the data mover 114 retrieves updated data stored on the primary storage 104 and writes it to the backup storage 106, but this data is later overwritten by older data during the static resynchronization process. Another danger is that the data mover 114 copies data to backup storage, overwriting a newer version of the data written by static resynchronization. Thus, to ensure data consistency, dynamic resynchronization (step 424) is performed instead of normal updating (step 426) whenever static resynchronization is occurring. Mirroring continues to occur as long as there is more data to update, as shown by step 428.

Static Resynchronization

Figure 5:
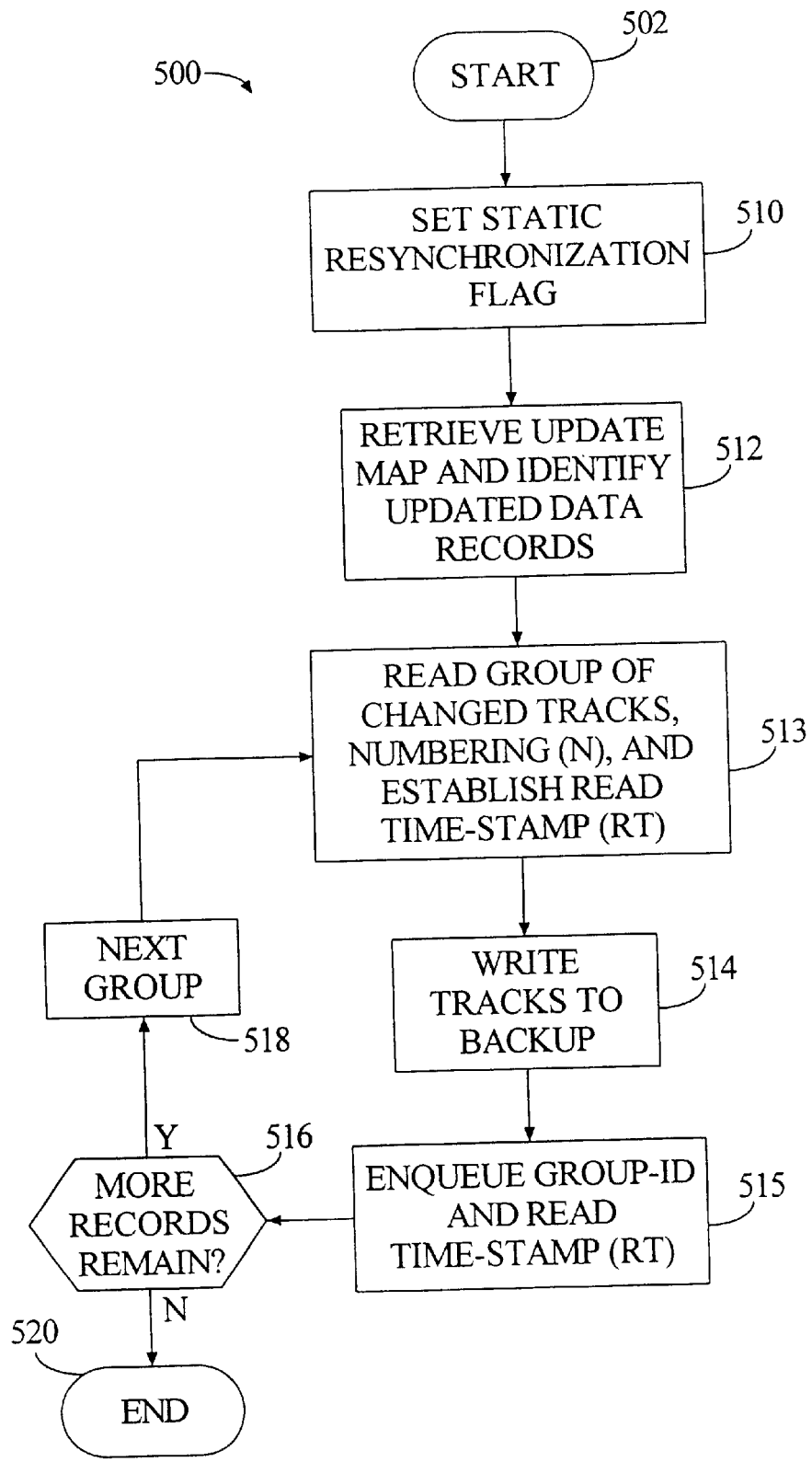
FIG. 5 is a flowchart of an operational sequence for static resynchronization in accordance with the invention.

FIG. 5 shows a sequence 500 to illustrate an example of static resynchronization in accordance with the present invention. For ease of explanation, but without any intended limitation, the example of FIG. 5 is described in the context of the hardware environment described above, with these operations being performed by the data mover 114. The sequence 500, which implements step 420 (FIG. 4), is initiated in step 502; step 502 is triggered by the resolution of an error condition, as shown in step 418, FIG. 4.

In step 510, the data mover 114 sets the static resynchronization flag 116 to show that static resynchronization is underway. In this example, step 510 involves storing a predetermined value in memory of the data mover 114. Next, in step 512, the data mover 114 retrieves the contents of the update map 118 to identify primary storage tracks that have not been updated to backup storage due to the error of steps 416/418. These are the tracks for which static resynchronization will be performed. In this example, the update map 118 lists each track by its address, and may comprise a bit map for example. During step 512, the data mover 114 blocks all other processes and hardware components from changing the update map 118.

In step 513, the data mover 114 obtains the contents of a first group of updated tracks from the controller 108, using the addresses from step 512. The group may include a fixed or variable group of one or more tracks. As an example, each group may contain three tracks. The controller 108 in turn reads the requested tracks from a consistency buffer, the primary storage 104, or another suitable location, many variations of which are known in the art. In this example, tracks are read in groups numbering "N." Also in step 513, the data mover 114 establishes a read time-stamp ("RT") for the group of records according to the clock 112. The read time-stamp is the time that the data mover 114 reads the tracks.

In step 514, the data mover 114 writes the group of N tracks from step 513 to the backup storage 106. Next, in step 515, the data mover stores a representation of the tracks of steps 513–514 in the progress queue 120. The tracks may be identified, for example, by a group-ID, address, or other suitable indicia. The tracks' read time-stamp is also enqueued in association with the identity of the tracks.

After step 515, step 516 determines whether there are any other tracks in the update map 118 that have not been processed by steps 513–515. If so, the next group of tracks is considered in step 518, and then processed as discussed above in steps 513–515. When all records of the update map have been processed, the static resynchronization process 500 ends in step 520.

Ongoing Mirroring

Figure 6:
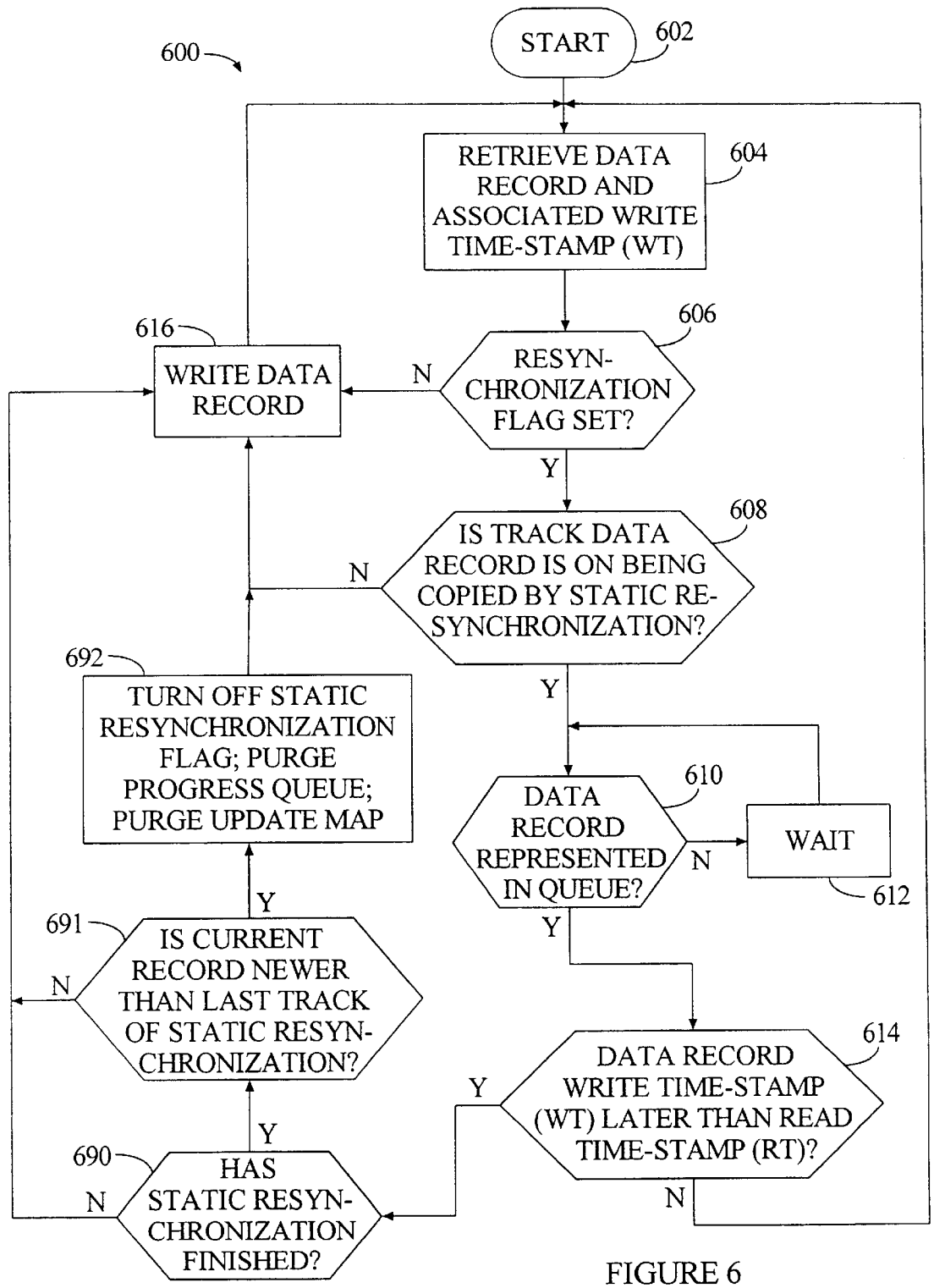
FIG. 6 is a flowchart of an operational sequence for dynamic resynchronization in accordance with the invention.

FIG. 6 shows a sequence 600 to illustrate an example of ongoing mirroring in accordance with the present invention. For ease of explanation, but without any intended limitation, the example of FIG. 6 is described in the context of the hardware environment described above, with these operations being performed by the data mover 114. The sequence 600, which implements step 422 (FIG. 4), starts in step 602.

After step 602, the data mover 114 receives or obtains a new data record from the primary controller 108. This data record is obtained because it has been received by the primary controller 108, and may have to be mirrored to the backup storage 106. It is referred to as the "current record." Along with the current data record, the data mover 114 also obtains the current data record's write time-stamp. Although application of this record to primary storage 104 is complete or in progress, it has not yet been applied to the secondary stage 106, and in this sense is "new." This "new" data record may also be called "updated." In step 606, the data mover 114 determines whether static resynchronization is underway, by asking whether the static resynchronization flag 116 is set. If not, dynamic resynchronization is unnecessary, and the current data record is mirrored to secondary storage 104 in step 616, which may occur by the normal update process. This step is also shown by step 426, FIG. 4.

On the other hand, if static resynchronization is in progress, step 606 proceeds to steps 608–614 and 690–692, which perform the dynamic resynchronization process 424 (FIG. 4). First, step 608 asks whether the current record is presently the subject of static resynchronization. Namely, step 608 determines whether the update map 118 is set for the track that includes current record. If not, then the current record is the first update to this track since the error condition occurred, i.e., since the primary and backup storage fell out of "synch." Accordingly, there is no consistency danger here. This update can therefore be made immediately, and is done so in step 616.

If the update map 118 is set for the current track, step 608 instead commences step 610. Step 610 determines whether static resynchronization has reached the current data record yet, i.e., whether the track containing the current data record is in the progress queue 120. If static resynchronization has not reached the current data record, the danger of writing the current record out of order cannot be determined. In this case, steps 610–612 wait until the track containing the current data record appears in the progress queue 120. Then, step 614 determines whether the data record's write timestamp (from step 604) is later than the enqueued read time-stamp for its associated track (from step 515). If not, then the current data record is older than the track being applied by static resynchronization, and the data record is discarded, with step 614 returning to step 604 to consider another update record.

On the other hand, if the current data record is newer than the track record being applied by static resynchronization, the current data record can be written to backup storage 106, as discussed below in step 616. Before step 616, however, steps 690–691 determine whether the static resynchronization flag, progress queue, and update map can be cleared. Particularly, step 690 first asks whether static resynchronization has finished. If not, step 690 advances to step 616, where the data record is written to backup storage 106. If static resynchronization is finished, step 691 asks whether the current record is newer than the last track processed by static resynchronization. This is determined by asking whether the current update's write time-stamp is newer than the read time-stamp of the last track copied by static resynchronization (i.e., the last track in the progress queue 120). If not, step 691 proceeds to write the data record in step 616. Otherwise, if both steps 690–691 answer affirmatively, step 692 proceeds to turn off the static resynchronization flag 116, purge the progress queue 120, and purge the update map 118. After step 692, the routine 600 advances to step 616, where the current data record is written to backup storage 106.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method of resynchronizing data contained in a data storage system having primary and backup storage sites both coupled to a data mover, the primary storage site coupled to a host that provides write data to the primary storage site, the data mover serving to mirror data stored at the primary storage site upon the backup storage site, where during predetermined error conditions the data mover stores data received by the storage system in the primary storage site without mirroring the data to the backup storage site, the method comprising:

after termination of an error condition, the data mover performing a static resynchronization process comprising:
identifying data received during the error condition at the primary storage site without mirroring to the backup storage site;
reading the identified data from the primary storage site at one or more read times;
writing the read data to the backup storage site; and
the primary storage site receiving update data from the host for storage while no error condition is occurring, the update data representing changes to data already existing on the primary storage site, and in response:
the data mover determining whether the static resynchronization process is in progress, and if not, copying the update data to the backup storage site;
if the static resynchronization process is in progress, the data mover determining whether the static resynchronization process is already processing data corresponding to the existing data, and if not, copying the update data to the backup storage site;
if the static resynchronization process is already processing data corresponding to the existing data, the data mover copying the update data to the backup storage site only if the host provided the update data to the primary storage site after the static resynchronization read time for the data already being processed.

2. The method of claim 1, where:
the data mover configures an update map to identify data received by the storage system in the primary storage site without mirroring the data to the backup storage site due to a predetermined error condition;
the identifying of the data received during the error condition at the primary storage site without mirroring to the backup storage site comprises consulting the update map; and
the determining of whether the static resynchronization process is already processing data corresponding to the existing data comprises the data mover determining whether the update data is identified in the update map.

3. The method of claim 1, where:
the reading of the identified data from the primary storage site at one or more read times further includes:
repeatedly reading groups of the identified data until all identified data has been read; and
for each group of read data, storing indicia representing the read data in a progress queue along with a time of the reading.

4. The method of claim 1, where:
the static resynchronization process further comprises setting a static resynchronization indicator; and
the determining of whether the static resynchronization process is in progress comprises determining whether the static resynchronization indicator is set.

5. The method of claim 1, where the primary storage site and backup storage site include disk storage media and the primary storage site receives update data as records comprising subparts of a tracks.

6. A method of resynchronizing data contained in a data storage system having primary and backup storage sites both coupled to a data mover, the primary storage site coupled to a host that provides write data to the primary storage site, the data mover serving to mirror data stored at the primary storage site upon the backup storage site, where during predetermined error conditions the data mover stores data received by the storage system in the primary storage site without mirroring the data to the backup storage site, the method comprising:

after termination of an error condition, the data mover performing a static resynchronization process comprising:

identifying data received during the error condition at the primary storage site without mirroring to the backup storage site;

reading the identified data from the primary storage site at one or more read times;

writing the read data to the backup storage site; and responsive to the primary storage site receiving update data from the host while the static resynchronization process in progress, the update data representing changes to data already existing on the primary storage site, the data mover determining whether the static resynchronization process is already processing data corresponding to the existing data, and if so, the data mover copying the update data to the backup storage site only if the host provided the update data to the primary storage site after the static resynchronization read time for the data already being processed.

7. A data storage system, comprising:

a primary digital data storage site, coupled to a host that provides write data to the primary storage site;

a backup digital data storage site;

a data mover coupled to the primary storage, backup storage, the data mover being programmed to mirror data stored at the primary storage site upon the backup storage site, where during predetermined error conditions the data mover stores data received by the storage system in the primary storage site without mirroring the data to the backup storage site, the data mover also being programmed to perform a method to resynchronize data of the backup data storage site with data of the primary data storage site comprising:

after termination of an error condition, the data mover performing a static resynchronization process comprising:

identifying data received during the error condition at the primary storage site without mirroring to the backup storage site;

reading the identified data from the primary storage site at one or more read times;

writing the read data to the backup storage site; and the primary storage site receiving update data from the host for storage while no error condition is occurring, the update data representing changes to data already existing on the primary storage site, and in response:

the data mover determining whether the static resynchronization process is in progress, and if not, copying the update data to the backup storage site;

if the static resynchronization process is in progress, the data mover determining whether the static resynchronization process is already processing data corresponding to the existing data, and if not, copying the update data to the backup storage site;

if the static resynchronization process is already processing data corresponding to the existing data, the data mover copying the update data to the backup storage site only if the host provided the update data to the primary storage site after the static resynchronization read time for the data already being processed.

8. The system of claim 7, where:

the system further includes an update map accessible by the data mover;

the data mover is further programmed to configure the update map to identify data received by the storage system in the primary storage site without mirroring the data to the backup storage site due to a predetermined error condition;

the identifying of the data received during the error condition at the primary storage site without mirroring to the backup storage site comprises consulting the update map; and the determining of whether the static resynchronization process is already processing data corresponding to the existing data comprises the data mover determining whether the update data is identified in the update map.

9. The system of claim 7, where:

the reading of the identified data from the primary storage site at one or more read times further includes:

repeatedly reading groups of the identified data until all identified data has been read; and for each group of read data, storing indicia representing the read data in a progress queue along with a time of the reading.

10. The system of claim 7, where:

the static resynchronization process further comprises setting a static resynchronization indicator; and the determining of whether the static resynchronization process is in progress comprises determining whether the static resynchronization indicator is set.

11. The system of claim 7, where the primary storage site and backup storage site include disk storage media and the primary storage site receives update data as records comprising subparts of a tracks a subpart of a track.

12. A signal-bearing medium tangibly embodying a program of machine-readable instructions executable by a digital processing machine to perform a method of resynchronizing data contained in a data storage system having primary and backup storage sites both coupled to a data mover, the primary storage site coupled to a host that provides write data to the primary storage site, the data mover serving to mirror data stored at the primary storage site upon the backup storage site, where during predetermined error conditions the data mover stores data received by the storage system in the primary storage site without mirroring the data to the backup storage site, the method comprising:

after termination of an error condition, the data mover performing a static resynchronization process comprising:

identifying data received during the error condition at the primary storage site without mirroring to the backup storage site;

reading the identified data from the primary storage site at one or more read times;

writing the read data to the backup storage site; and the primary storage site receiving update data from the host for storage while no error condition is occurring, the update data representing changes to data already existing on the primary storage site, and in response:
  the data mover determining whether the static resynchronization process is in progress, and if not, copying the update data to the backup storage site;
  if the static resynchronization process is in progress, the data mover determining whether the static resynchronization process is already processing data corresponding to the existing data, and if not, copying the update data to the backup storage site;
  if the static resynchronization process is already processing data corresponding to the existing data, the data mover copying the update data to the backup storage site only if the host provided the update data to the primary storage site after the static resynchronization read time for the data already being processed.

13. The medium of claim 12, where:
the data mover configures an update map to identify data received by the storage system in the primary storage site without mirroring the data to the backup storage site due to a predetermined error condition;
the identifying of the data received during the error condition at the primary storage site without mirroring to the backup storage site comprises consulting the update map; and
the determining of whether the static resynchronization process is already processing data corresponding to the existing data comprises the data mover determining whether the update data is identified in the update map.

14. The medium of claim 12, where:
the reading of the identified data from the primary storage site at one or more read times further includes:
  repeatedly reading groups of the identified data until all identified data has been read; and
  for each group of read data, storing indicia representing the read data in a progress queue along with a time of the reading.

15. The medium of claim 12, where:
the static resynchronization process further comprises setting a static resynchronization indicator; and
the determining of whether the static resynchronization process is in progress comprises determining whether the static resynchronization indicator is set.

16. The medium of claim 12, where the primary storage site and backup storage site include disk storage media and the primary storage site receives update data as records comprising subparts of a tracks.

17. A data storage system, comprising components of:
primary and backup storage sites, the primary storage site coupled to a host providing write data to the primary storage site;
a data mover coupled to the primary and secondary backup storage sites, and programmed to perform operations comprising:
  mirroring data stored at the primary storage site upon the backup storage site;
  during predetermined error conditions, storing data received in the primary storage site without mirroring the data to the backup storage site;
  resynchronization operations comprising:
    after termination of an error condition, the data mover performing a static resynchronization process comprising:
      identifying data received during the error condition at the primary storage site without mirroring to the backup storage site;
      reading the identified data from the primary storage site at one or more read times;
      writing the read data to the backup storage site; and
    responsive to the primary storage site receiving update data from the host while the static resynchronization process in progress, the update data representing changes to data already existing on the primary storage site, the data mover determining whether the static resynchronization process is already processing data corresponding to the existing data, and if so, the data mover copying the update data to the backup storage site only if the host provided the update data to the primary storage site after the static resynchronization read time for the data already being processed.

18. A signal-bearing medium tangibly embodying a program of machine-readable instructions executable by a digital processing machine to perform a method of resynchronizing data contained in a data storage system having primary and backup storage sites both coupled to a data mover, the primary storage site coupled to a host that provides write data to the primary storage site, the data mover serving to mirror data stored at the primary storage site upon the backup storage site, where during predetermined error conditions the data mover stores data received by the storage system in the primary storage site without mirroring the data to the backup storage site, the method comprising:
after termination of an error condition, the data mover performing a static resynchronization process comprising:
  identifying data received during the error condition at the primary storage site without mirroring to the backup storage site;
  reading the identified data from the primary storage site at one or more read times;
  writing the read data to the backup storage site; and
responsive to the primary storage site receiving update data from the host while the static resynchronization process in progress, the update data representing changes to data already existing on the primary storage site, the data mover determining whether the static resynchronization process is already processing data corresponding to the existing data, and if so, the data mover copying the update data to the backup storage site only if the host provided the update data to the primary storage site after the static resynchronization read time for the data already being processed.

* * * * *